United States Patent [19]

Schweighofer et al.

[11] Patent Number: 5,707,169

[45] Date of Patent: Jan. 13, 1998

[54] DEVICE FOR DETACHABLY LINES, ESPECIALLY FLEXIBLE TUBES, PIPES AND CABLES

[75] Inventors: Johann Schweighofer, Heiligenkreuz; Günther Wogg, Graz, both of Austria

[73] Assignee: AVL Gesellschaft Für Verbrennungskraftmaschinen und Messtechnik M.B.H. Prof.Dr.h.C. Hans List, Graz, Austria

[21] Appl. No.: 698,432

[22] Filed: Aug. 15, 1996

[30] Foreign Application Priority Data

Aug. 18, 1995 [AT] Austria ................ GM 451/95

[51] Int. Cl.⁶ ............................................. F16B 9/00
[52] U.S. Cl. ................. 403/391; 403/389; 248/68.1; 248/74.1
[58] Field of Search ................. 403/385, 391, 403/389, 388, 384, 346, 394, 396; 248/68.1, 74.1

[56] References Cited

U.S. PATENT DOCUMENTS

| | | | |
|---|---|---|---|
| 3,489,847 | 1/1970 | Netzel | 403/391 X |
| 3,531,071 | 9/1970 | Kubli | 403/391 X |
| 3,742,119 | 6/1973 | Newman | 248/68.1 X |
| 4,131,257 | 12/1978 | Sterling | 248/68.1 X |
| 4,597,690 | 7/1986 | Girard | 403/391 |
| 4,646,395 | 3/1987 | Mayszak | 248/68.1 X |
| 5,098,047 | 3/1992 | Plumley | 248/68.1 |
| 5,123,547 | 6/1992 | Koch | 248/68.1 X |
| 5,377,939 | 1/1995 | Kirma | 248/68.1 |

FOREIGN PATENT DOCUMENTS

| | | | |
|---|---|---|---|
| 592028 | 2/1960 | Canada | 403/388 |
| 75 35396 | 6/1977 | France | |
| 2404139 | 5/1979 | France | 403/391 |

*Primary Examiner*—Harry C. Kim
*Attorney, Agent, or Firm*—Watson Cole Stevens Davis, P.L.L.C.

[57] ABSTRACT

A device for detachably fastening lines and conduits, in particular, flexible tubes, pipes and cables, to a support, which includes a mounting element surrounding and holding the lines, the mounting element including at least one stackable holding module whose plane front face is approximately parallel to the surface of the support. The front face is held at a distance from the surface of the support by spacer elements provided integral with the holding module, the wall area of the latter including guiding strips projecting from the front face towards the surface of the support, as well as apertures for the lines. By way of a fastening bolt going through a center bore on the front face, the mounting element is detachably fastened to the support. In plan view the exterior edges of the holding module define a shape of at least threefold symmetry. In this manner it will be possible to obtain a precise, predefined, secure, space-saving and well-ordered layout for lines of different orientation.

11 Claims, 1 Drawing Sheet

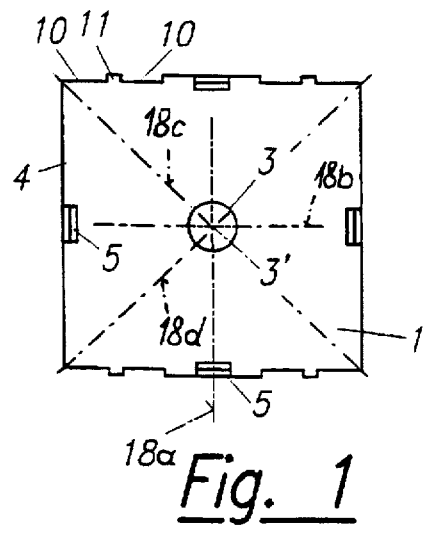
Fig. 1
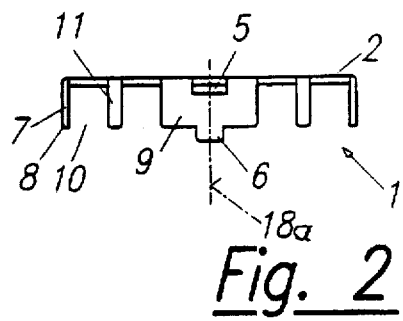
Fig. 2
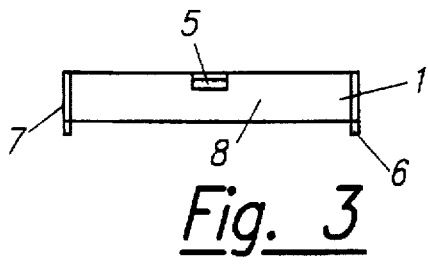
Fig. 3
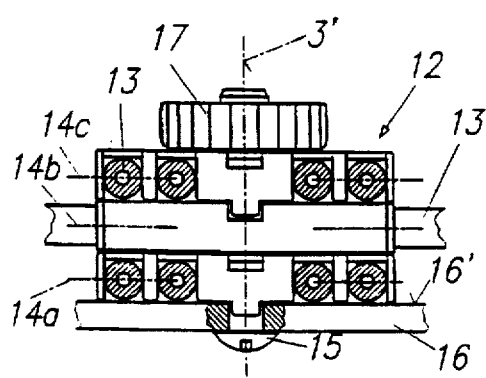
Fig. 8
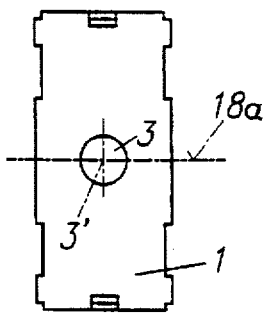
Fig. 4
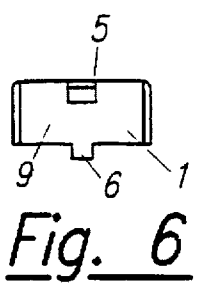
Fig. 6
Fig. 5
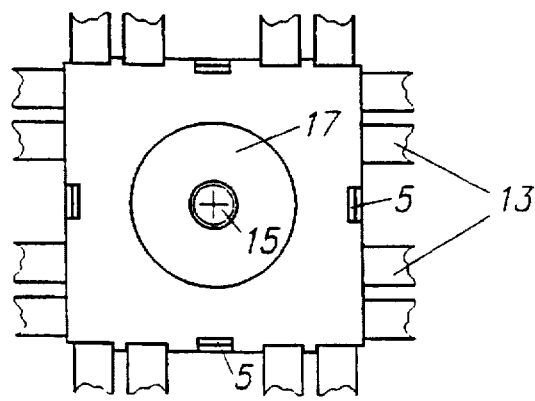
Fig. 7
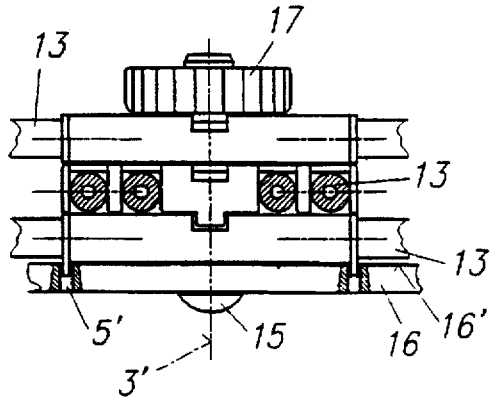
Fig. 9

DEVICE FOR DETACHABLY LINES, ESPECIALLY FLEXIBLE TUBES, PIPES AND CABLES

BACKGROUND OF THE INVENTION

This invention relates to a device for detachably fastening lines, especially flexible tubes, pipes and cables, to a support, with a mounting element surrounding and holding the lines, which is attached to the support, the mounting element comprising at least one stackable holding module whose front face is approximately parallel to the surface of the support, and is held at a distance from the surface of the support by means of spacer elements provided integral with the holding module, the wall area of the latter including guiding strips, guide pins, or similar such elements projecting from the front face towards the surface of the support, as well as apertures for the lines.

DESCRIPTION OF THE PRIOR ART

In test and laboratory equipment, above all, a complex circuitry of pipes, tubes and cables is sometimes inevitable. Lines and conduits running in parallel at least over part of the distance, are therefore combined into bunches. This is usually achieved by means of clips, collars, straps, or the like. Such arrangements require a lot of space and may be quite confusing, thus complicating maintenance work. In many instances the crossing of bunched cables cannot be avoided, often leading to multilevel cable crossings. Since conventional fastening means are designed for a two-dimensional cable layout, loose loops are formed at the crossings. Such loops do not permit well-defined, precise arrangements, however, and increase the risk of damage for the lines.

In FR 2 332 634 A a device of the above type is disclosed in which holding modules of thermoplastic material are stacked and snap-locked. The device is designed in such a way that all lines of the holding modules must run in parallel as no crossings are possible.

SUMMARY OF THE INVENTION

It is an object of the invention to avoid the above disadvantages and to provide a device for fastening lines which will permit a precise, predefined, secure, space-saving and well-ordered layout for lines of different orientation.

In the invention this object is achieved by providing that the exterior edges of the holding module define a shape of at least threefold symmetry in plan view, and by providing a central mounting bore at the module's front face for a fastening bolt attached to the support. Due to the threshold symmetry of the plan shape two holding modules can be rotated relative to each other through an angle smaller than 180 degrees and still be stacked such that their shapes are in congruence. This will permit a parallel, well-ordered, space-saving layout for the lines on each level, while permitting different orientations between two levels and a clear arrangement of crossings.

It is provided in a preferred embodiment of the invention that a stack of at least two holding modules be attachable to the fastening bolt on the support by means of a wing nut or knurled thumb nut. Thus, any number of circuitry levels may be achieved, one above the other, the maximum number of levels being determined only by the length of the fastening bolt and the height of the holding modules used. By rotating the holding modules around the axis of the fastening bolt, cable crossings may be realized while ensuring that lines or conduits that are crossing at different levels do not impede each other. In the crossing area itself the lines are precisely held in position by the mounting elements such that the formation of loops is prevented. The angle between crossing bunches of cables is determined by the geometrical shape of the holding modules. If a prism-shaped holding module with quadratic front face is used, the crossing angle is approximately 90 degrees. If the holding module has the shape of a circular cylinder, any choice of crossing angle is possible.

In order to precisely secure two stacked holding modules in a predefined position, one or several openings may be provided in the peripheral area of the front face, which cooperate with one or several centering pins at the lower edge of the stack. The openings are advantageously configured point-symmetrical relative to the axis of the fastening bolt.

A cost-efficient and robust construction is obtained by manufacturing the holding module from corrosion-resistant sheet metal.

In practice an easy-to-produce variant has been found useful in which the shape of the holding modules is substantially quadratic or rectangular in plan view.

To realize a well-ordered layout of circuitry it will be of advantage if at least two opposite faces of the wall area of the holding module are provided with apertures for two or more, preferably four, lines, the apertures being positioned symmetrically relative to a longitudinal plane going parallel to the lines through the axis of the fastening bolt.

BRIEF DESCRIPTION OF THE DRAWINGS

The invention will be further described with reference to the accompanying drawings, in which FIGS. 1, 2, and 3 show a holding module of the invention, in plan view, elevation, and side elevation, and FIGS. 4, 5, and 6 show another holding module. FIGS. 7, 8 and 9 represent plan view, elevation and side elevation of a mounting element consisting of a stack of holding modules.

Parts of identical function have identical reference numbers.

DETAILED DESCRIPTION OF PREFERRED EMBODIMENTS

The holding module 1 shown in FIGS. 1 to 3 substantially has the shape of a hollow box which is open at the bottom. As shown in FIG. 1, a central mounting bore 3 is provided in the front face 2 of the holding module 1. At the periphery 4 of the front face 2 openings 5 are provided for holding centering pins 6 of a further stacked module 1. The centering pins 6 are located on strip-like lateral spacer elements 9. The wall area 7 of the holding module 1 comprises guiding strips 8 projecting downwards for guiding the lines laterally, as is shown in FIG. 2. In at least two opposite faces of the wall area 7 apertures 10 are provided for the lines 13, with optional guiding pins 11 between two apertures 10. Guiding strips 8 and guiding pins 11 may also serve as spacer elements 9 at the same time. A longitudinal plane going through the bolt axis 3' parallel to the lines 13 has the reference number 18a, apertures 10 being positioned symmetrically to this plane.

A quadratic shape of the holding module 1 as shown in FIGS. 1 to 3 has the advantage that in the instance of stacked modules it will be possible to alter the orientation of multi-level lines 13 by rotating a holding module 1 by 90 degrees around the axis 3' of the fastening bolt, such that crossings are realized. The symmetry planes of the quadratic shape with its fourfold symmetry are marked 18a, 18b, 18c, 18d. In the instance of parallel, non-crossing lines 13 the holding modules 1 may be rectangular instead of quadratic in shape, as is shown in FIGS. 4, 5, 6. This configuration will save space, though it will no longer permit to obtain congruent positioning of the holding modules after rotating them relative to each other through an angle smaller than 180 degrees.

FIGS. 7, 8, 9 show a quadratic mounting element 12 which is made up of three stacked holding modules 1. The lines 13 run on three levels 14a, 14b, 14c, all lines 13 of one and the same level going in parallel. By means of a fastening bolt 15 going through the mounting bores 3, the stack 12 of holding modules 1 is detachably fastened to a support 16, for example, the panel of a switchboard. If a knurled thumb nut 17 or wing nut is used in cooperation with the fastening bolt 15, the holding modules 1 may be assembled and disassembled more rapidly. The centering pins 6 of the holding module 1 next to the surface 16' of the support 16 cooperate with openings 5' in surface 16', such that a predefined orientation of the holding modules 1 is established.

The use of quadratic holding modules 1 will permit orthogonal line layout. Special applications may require line crossings of any chosen angle, or reorientation of lines of a certain given angle. Angles of any size may be obtained with the use of holding modules of substantially circularly cylindrical shape, for instance. Reorientations of lines by about 30 degrees are achieved by means of prismatical modules of triangular or hexagonal shape. In addition, any other polygon of at least threefold symmetry of shape would be conceivable.

It has been found useful in practice to manufacture the holding modules 1 of thin-walled sheet steel for greater robustness and resistance. It would also be possible, however, to use plastic material for this purpose.

We claim:

1. A device for detachably fastening lines, especially flexible tubes, pipes and cables, to a support, comprising:

a mounting element having recesses for holding said lines, said mounting element being attachable to said support, said mounting element comprising at least one stackable holding module whose front face will be approximately parallel to a surface of said support when attached thereto, and is held at a distance from said surface by means of spacer elements provided integral with said holding module, whereby a wall area of said holding module includes guiding strips or guide pins projecting from a front face towards said surface of said support, as well as apertures for said lines, wherein exterior edges of said holding module define a shape which is symmetrical to at least three symmetric axis in plan view, and a central mounting bore is provided at said module's front face for a fastening bolt to be attached to said support, and wherein at least one opening is provided in a peripheral area of said front face which cooperates with at least one centering pin at a lower edge of said stack of holding modules.

2. A device according to claim 1, wherein a stack of at least two holding modules is attachable to said fastening bolt on the support by means of a wing nut or knurled thumb nut.

3. A device according to claim 1, wherein the openings are configured so as to be point-symmetrical relative to the axis of said fastening bolt.

4. A device according to claim 1, wherein said holding module is made of corrosion-resistant sheet metal.

5. A device according to claim 1, wherein said holding module is substantially quadratic in plan view.

6. A device according to claim 5, wherein at least two opposite faces of said wall area of said holding module are provided with apertures for at least two lines, said apertures being positioned symmetrically relative to a longitudinal plane going parallel to said lines through the axis of said fastening bolt.

7. A holding module for use in a device for detachably fastening lines to a support, said holding module comprising:

a flat face portion which defines peripheral edges and lies in an imaginary plane, a plurality of wall portions and guiding pins which extend from said flat face portion perpendicularly to said imaginary plane to define apertures through which said lines can extend, said wall portions and guiding pins being located such that said holding module is symmetrical along at least three axes in plan view, and a lateral spacer extending perpendicularly from said flat face portion perpendicularly to said imaginary plane, said lateral spacer defining a centering pin at an end thereof remote from said flat face portion, said flat face portion defining a first opening centrally located therein through which a fastening bolt can extend, and a second opening where said lateral spacer is connected thereto for positioning of a centering pin of a lateral spacer of another holding module positioned thereover.

8. A holding module according to claim 7, wherein said plurality of wall portion and guiding pins are attached to said flat face portion at peripheral edges thereof.

9. A holding module according to claim 8, wherein said lateral spacer is connected to said flat face portion at a peripheral edge thereof.

10. A holding module according to claim 7, wherein said flat face portion is rectangular in plan view and defines four peripheral edge portions.

11. A device for detachably fastening of a plurality of lines that extend in differing directions such that they cross one another, said device including a plurality of holding modules stacked one on another, each holding module comprising:

a flat face portion which defines peripheral edges and lies in an imaginary plane, a plurality of wall portions and guiding pins which extend from said flat face portion perpendicularly to said imaginary plane to define apertures through which said lines can extend, said wall portions and guiding pins being located such that said holding module is symmetrical along at least three axes in plan view, and a lateral spacer extending perpendicularly from said flat face portion perpendicularly to said imaginary plane, said lateral spacer defining a centering pin at an end thereof remote from said flat face portion, said flat face portion defining a first opening centrally located therein through which a fastening bolt can extend, and a second opening where said lateral spacer is connected thereto for positioning of a centering pin of a lateral spacer of another holding module positioned thereover.

* * * * *